2,753,316
Patented July 3, 1956

2,753,316

PROCESS OF FORMING A CONDENSATION PRODUCT OF AN ALKYL ETHER OF PHENOL AND AN ALDEHYDE AND THE RESULTING COMPOSITION IN COMBINATION WITH COLLOIDAL SILICA

Joseph A. Campbell, Manhattan Beach, Calif., assignor to X-Port Oils, Inc., Los Angeles, Calif., a corporation of California No Drawing. Application May 26, 1952,
Serial No. 290,087

7 Claims. (Cl. 260—29.3)

This invention relates to improvements in the manufacture of thermosetting resins and in the production of formed objects made therefrom. The invention is particularly directed to thermosetting resins of the phenol-aldehyde type modified in such manner that they are rendered stable, infusible and strong at temperatures above 500° F.

Phenol-formaldehyde resins are well known and the intermediate condensation products (either in the form of liquids or of fusible solids) can be used as adhesives, in the manufacture of laminates, as extrusions, coatings, and castings. These phenolic-aldehyde resins have good dimensional stability, electrical insulating qualities and resistance to water and chemicals. The resistance to heat is limited and at temperatures of 300° F.–400° F. they have very little structural strength.

The industrial arts are in need of resins which are stable and strong at temperatures in excess of 500° F. Guided missiles and military aircraft are attaining speeds and reaching into stratospheric areas where the missile or aircraft is subjected to relatively high temperatures. These temperatures may be due to skin friction or to passage through zones of high temperature. It is necessary, therefore, to make certain that adhesives and formed parts employed in guided missiles are capable of withstanding temperatures on the order of 700° F.–1000° F. and higher temperatures without destruction or material loss in strength. Canopies, fairings, wings, rudders, skins, and other portions of guided missiles and aircraft can well be made of resins or resin-impregnated materials, provided such resins maintain their stability and strength at such high temperatures. Many mechanical devices such as ducts, fan blades, compressors and blowers of jet engines and other mechanical devices can be made from resins or resinous compositions and thereby decrease the dead weight of the missile, aircraft or engine, provided such resins do not lose their strength and mechanical stability at high temperatures of above 500° F. Moreover, by using thermosetting resins and normal casting and forming techniques the various component parts of aircraft and guided missiles can be manufactured much more economically and with the expenditure of but a fraction of the number of man hours required to machine such elements or parts from metal.

The use of thermosetting resin for these and various other purposes has been retarded by the inability of normal thermosetting resins to maintain their stability and strength at temperatures of above about 400° F. For example, most phenolics are not produced for use at temperatures in excess of about 350° F. At normal atmospheric temperatures they may have a flexural strength of about 10,000–15,000 p. s. i., but at temperatures of 350° F. the flexural strength may be only 200 p. s. i. and some distortion and flow may take place by reason of the heat.

The present invention is directed to improvements in the manufacture of phenolic resins whereby stability and strength are retained at temperatures in excess of 500° F. so that fabrics made out of spun glass and impregnated with resins of the present invention can be formed or molded into objects capable of being subjected to temperatures in excess of 750° F. without loss of desired physical characteristics.

Generally stated, this invention is based upon the discovery that unexpectedly beneficial results are obtained by etherization of the phenol used in the production of a thermosetting resin of the phenol-aldehyde type. Such etherization may be performed prior to reaction with the aldehyde or it may be continued and/concluded during the final setting and curing step. Moreover, this invention contemplates the formation of very finely divided, solid, reenforcing material in situ within a phenolic resin during setting, thereby permitting the production of substantially impervious resinous bodies of exceptional dielectric strength.

Generally stated, the improved thermosetting resin can be produced by forming a phenolic ether and reacting it with formaldehyde (or other aldehyde). Final etherization may take place during curing in the presence of an alcohol.

Phenolic ethers may be produced in a number of different ways. Phenol may be directly converted into an ether by passing vapors of phenol and a desired alcohol over a catalyst, such as thoria, at a suitable temperature. An ether such as isopropylphenyl ether may also be made directly in the liquid phase by conducting the reaction between phenol and isopropyl alcohol in the presence of a catalyst such as zinc chloride (and a small amount of water) at temperatures of, say 360°–380° F., the phenol and alcohol being present in substantially molecular proportions.

A simple way of making a phenol ether, however, comprises reacting an alkyl or aryl ester, such as isopropyl phosphate, with a phenol or phenate. For example, isopropyl alcohol may be used to react with phosphoric acid under reflux conditions at a temperature of about 200° F. to form the ester, isopropyl phosphate, three mols of alcohol being used per mol of phosphoric acid. Sodium phenate can be made separately by reacting phenol and sodium hydroxide in molecular proportions and in the presence of five to six mols of water, this reaction being exothermic and rapid. The syrupy isopropyl phosphate can then be reacted with the sodium phenate at a temperature of, say 150°–175° F. to form the phenolic, isopropylphenyl ether. This will separate as an upper, oily liquid, together with excess alcohol present, whereas the lower portion of the reactor vessel will contain a relatively heavy solution of sodium phosphate. It is to be noted that water should not be added during the reaction between the sodium phenate and the ester and should not be added to the product of the reaction, since the addition of water will cause the ether and the sodium phosphate solution to form a homogeneous phase and prevent ready separation of the phenyl ether from the remaining products of reaction.

The isopropylphenyl ether made as above described can then be reacted with formaldehyde or commercial formalin, the ether being substituted in place of the phenol ordinarily used. This reaction may be conducted under substantially the same conditions as the ordinary phenol-formaldehyde reactions and it has been found that the use of seven mols or more of formaldehyde (as such) to six mols of phenol (contained in the ether) in the presence of an alkaline catalyst (such as ammonia or caustic soda) produces good results. The reaction should be carried out in a jacketed kettle and under reflux conditions so as to be able to maintain control of temperatures. The reaction temperature may rise to 210°–225° F.; the time of reaction may vary with heat input and is stopped by cooling the reaction vessel when the physical properties of the resin are found satisfactory. These reactions are generally carried on until samples withdrawn show that the resinous product has the desired physical properties; the index of refraction of the resin forms a satisfactory and accurate criterion of the extent to which condensation has taken place. By noting physical properties and refractive index of resins made from a given ether, at various stages of condensation, polymerization and time of reaction, subsequent batches can be quickly tested by determining index of refraction alone.

The preferred resins so obtained are thick, syrupy and soluble in alcohol. They can be cured at temperatures of 280°–375° F. to an initial set within a short period of time, say five to twenty minutes, and then subjected to a further curing for a prolonged period of time at a temperature of between about 400° and 500° F. The relatively protracted curing at such high temperature (curing for two to twenty hours) is believed to result in an added etherization of at least some of the phenol present. It is believed that during such relatively long, high-temperature curing the hydrogen of the free hydroxyl of the excess phenol present combines with the OH of the isopropyl alcohol still present, resulting in the formation of additional isopropyl-phenyl ether. Although two-stage curing appears to give good results, one-stage curing at a temperature of 375°–500° F. for a period of twenty minutes to several hours may also be employed.

The resins thus obtained can be used as successful adhesives at temperatures of between 500° F. and 1000° F.; these resins have a shear strength of over 500 p. s. i. at 500° F. When the resin is used as an impregnant in laminates of glass fiber fabrics, specimens of the resulting laminates exhibit a flexural strength of over 60,000 p. s. i. after one-half hour at 500° F., some specimens exhibiting flexural strength of over 90,000 p. s. i. These shear and flexural strength characteristics are substantially unchanged at temperatures of 700° F. Lack of testing facilities has made it impossible to conduct tests at higher temperatures, but all indications are that these resins maintain stability up to about 850°–1000° F.

It is to be understood that etherization may be applied not only to phenol but also to the di-, tri-, and polyhydric phenols and to substituted phenols, such as those in which only the meta position is substituted. Naphthols and di- and trihydric phenols can be used. Although formaldehyde is the preferred aldehyde for use in the reaction, other aldehydes, such as acetaldehydes and furfuraldehydes, may also be employed. The phenolic ether may be made by reacting a phenol or substituted phenol with an ester in the presence of any monohydric primary, secondary or tertiary alcohol containing not more than eight carbon atoms.

In one form of this invention a phenate such as sodium phenate may be reacted with formaldehyde (formalin) and then the resin is etherized by the addition of say ethyl or methyl acetate (or its equivalent) in molecular quantity sufficient to satisfy all hydroxyl groups on the phenol (or all NaO present). After etherization reaction, the aqueous solution of sodium acetate (or its equivalent) is removed by decantation or separation.

By permitting the reaction here disclosed to continue to substantial completion very viscous resins (apparently containing long chains and cross linkages) are obtained. The presence of excess solvent precludes the difficulties engendered by high viscosity. For example, when one volume of phenol is partially reacted with formaldehyde (formalin) and then one volume of methyl ethyl ketone, benzol, alcohol or other suitable solvent is added and the mixture further reacted with agitation under a reflux condition, the excess of solvent permits the production of very viscous resins exhibiting long and cross linked chains. At near the end point of the reaction the resin is of such density that inversion takes place and the resin sinks to the bottom of the reactor (even though the resin contains material quantities of solvent in it), the aqueous phase rising to the top. Actually, the reaction can be continued until the resin reaches a precipitating, substantially solid stage.

The improved resins resulting from the invention described hereinabove are of particular value in the use of laminates and formed objects wherein the resin is used as an impregnating medium. For example, fabrics may be dipped into the resinous solutions, permitted to dry and then pressed or formed under heat into desired shapes and objects. Pressing may take place at from about 10 p. s. i. to over 1000 p. s. i., and curing at temperatures of from 300° F. to 450° F. Layers of such impregnated cloth, in superimposed relation, may be used in forming various objects. Fabrics of asbestos or spun glass fibers are particularly adapted for use in the manufacture of strong, temperature-stable objects. The dipping or impregnation may be repeated several times before curing; the finished objects may contain from 15 per cent to 60 per cent of resin when the fabric is of spun glass, 8 harness satin weave, weighing 8.9 ounces per square yard.

In order to increase the mechanical strength, and dielectric characteristics of any phenolic resin and to render the resin suitable for use in radomes (where permeability to ultra high frequencies is desired) and in electronic devices, and to impart greater stability to resinous products made therefrom, it has been found desirable to form colloidal silica within the resin. For example, silicic acid (derived from sodium silicate by ion exchange) may be dispersed in a phenolic resin (or the resin of this invention) by means of isopropyl or other alcohol or organic solvent, colloidal silica being formed in homogenous dispersion throughout the resin during curing, or an organic orthosilicate may be added to the liquid thermosetting resin, anhydrous alcohol being used as an incorporating vehicle. These organic orthosilicates, such as for example, ethyl silicate, hydrolyze in water, but can be incorporated into a liquid thermosetting phenolic resin, even though the latter contains material amounts of water, by the use of virtually anhydrous alcohol, such as for example, isopropyl alcohol. Relatively large quantities of these organic orthosilicates can be thus added to the resin before the latter is used in molding, impregnating or laminating operations; for example, the final mixture may comprise from 15 per cent to as high as 60 per cent by weight of ethyl silicate, 75 per cent–25 per cent of a phenolic resin, and from 0 per cent to 20 per cent of anhydrous alcohol. Optimum results appear to be obtained by using between about 15 per cent and 35 per cent to 40 per cent of the alkyl silicate, a resin containing some water (say 5 per cent–10 per cent) and sufficient anhydrous alcohol to form a clear solution. These clear, viscous solutions may be used in the normal manner for impregnating, spraying, laminating, casting, as adhesives, etc. When used in impregnating fabrics, it will be found that during drying of such fabrics at temperatures of, say 175°–200° F., silica in colloidal form will be precipitated throughout the resin and in the interstices of the fabric as the alcohol evaporates. After setting and curing it will be found that this finely divided, colloidal silica exerts a remarkable reenforcing effect, greatly increasing the flexural strength of the molded or formed object and materially increasing the dielectric strength. Absorption and permeability are greatly reduced.

The methods and compositions of this invention produce resins and resinous products which have remarkably valuable characteristics. Although their stability, strength and resistance to high temperatures have been stressed hereinabove, they also exhibit high dielectric strength, high tensile strength, a higher elastic modulus than any resins known heretofore, particular adaptability for use in electronic devices, a better machinability, a very low (insignificant) absorption, and remarkably small change in physical properties after boiling in water.

All changes and modifications coming within the scope of the appended claims, and all uses and advantages flowing therefrom are embraced thereby.

I claim:
1. A thermosetting resin capable of forming objects of enhanced heat resistance comprising: a condensation product of an alkyl ether of phenol and an aldehyde, an alkyl silicate and saturated monohydric alcohol; said resin developing colloidal silica dispersed therethrough during drying and setting.

2. A thermosetting resin having the properties of forming objects of enhanced strength, and heat resistance comprising: a liquid thermosetting resinous condensation product of an alkyl ether of phenol and an aldehyde, and an alkyl orthosilicate in solution in a substantially anhydrous saturated alcohol.

3. A thermosetting resin having the property of forming objects of enhanced strength and resistance to heat, comprising: a liquid thermosetting resinous condensation product of a water insoluble alkyl ether of phenol and an aldehyde, said resinous product having from between about 15% to about 35% by weight of an alkyl orthosilicate in solution therein, a minor amount of water and not more than about 25% by weight of a saturated alcohol.

4. A thermosetting resin comprising a condensation product of a water insoluble alkyl ether of phenol and an aldehyde, said resin containing an alkyl silicate dispersed therethrough, said silicate, upon curing of an object formed from said resin, precipitating colloidal silica throughout the object.

5. A method of producing thermosetting etherized phenol-aldehyde resins of enhanced strength, heat resistance and dielectric characteristics, said resins having a high shear and flexural strength at temperatures above 500° F., comprising: condensing a water insoluble alkyl ether of phenol with an aldehyde in the presence of an excess of a solvent to form a resinous product, separating said resinous product, disseminating colloidal silica into the separated product by means of anhydrous saturated monohydric alcohol, and curing the resulting resin-silicate-alcohol mixture to precipitate colloidal silica uniformly therethrough.

6. The method of claim 5 wherein said colloidal silica is disseminated as an alkyl orthosilicate dispersed in a substantially anhydrous saturated monohydric alcohol.

7. The method of claim 5 wherein said colloidal silica is disseminated as silicic acid dispersed in a substantially anydrous saturated monohydric alcohol.

References Cited in the file of this patent

UNITED STATES PATENTS

| | | |
|---|---|---|
| 1,668,444 | Aiken | May 1, 1928 |
| 2,003,291 | Hill | June 4, 1935 |
| 2,067,960 | Werntz | Jan. 19, 1937 |
| 2,178,829 | Bruson et al. | Nov. 7, 1939 |
| 2,224,815 | Glycofrides | Dec. 10, 1940 |
| 2,256,612 | Ellis | Sept. 23, 1941 |
| 2,451,410 | Queeny | Oct. 12, 1948 |

OTHER REFERENCES

Robitschek et al.: Phenolic Resins, pub. by Iliffe and Sons Ltd. (1950).